United States Patent
Taniguchi et al.

(10) Patent No.: US 8,310,181 B2
(45) Date of Patent: Nov. 13, 2012

(54) MOTOR DRIVE SYSTEM USING POTENTIAL AT NEUTRAL POINT

(75) Inventors: Makoto Taniguchi, Oobu (JP);
Kazunari Moriya, Seto (JP); Takaji Umeno, Nisshin (JP); Kosuke Aiki, Aichi-ken (JP)

(73) Assignee: Denso Corporation, Kariya (JP)

( * ) Notice: Subject to any disclaimer, the term of this patent is extended or adjusted under 35 U.S.C. 154(b) by 344 days.

(21) Appl. No.: 12/820,303

(22) Filed: Jun. 22, 2010

(65) Prior Publication Data
US 2010/0320945 A1    Dec. 23, 2010

(30) Foreign Application Priority Data
Jun. 22, 2009    (JP) .................................. 2009-147970

(51) Int. Cl.
*H02P 6/10*    (2006.01)
(52) U.S. Cl. .................. 318/400.02; 318/400.23
(58) Field of Classification Search ............. 318/400.01, 318/400.02, 400.15, 400.23, 400.24, 400.26, 318/400.32, 400.36
See application file for complete search history.

(56) References Cited

U.S. PATENT DOCUMENTS

| | | | |
|---|---|---|---|
| 6,066,928 A | 5/2000 | Kinoshita et al. | |
| 6,320,775 B1 * | 11/2001 | Ito et al. | 363/132 |
| 7,816,805 B2 * | 10/2010 | Tanaka et al. | 307/10.1 |
| 7,969,104 B2 * | 6/2011 | Taniguchi | 318/139 |
| 8,040,096 B2 * | 10/2011 | Taniguchi | 318/490 |
| 8,129,932 B2 * | 3/2012 | Sakai | 318/400.32 |

FOREIGN PATENT DOCUMENTS

| | | |
|---|---|---|
| JP | 11-178114 | 7/1999 |
| JP | 2001-204196 | 7/2001 |

* cited by examiner

*Primary Examiner* — Bentsu Ro
(74) *Attorney, Agent, or Firm* — Nixon & Vanderhye PC

(57) ABSTRACT

According to input parameters, a controller carries out: generation of a voltage command value for each of d- and q-axes; conversion of the voltage command value for each of the d- and q-axes into a voltage command value for each of the multiphase windings; and control of a multiphase inverter based on the voltage command value for each of the multiphase windings. The controller adds, to the voltage command value for the q-axis, a first compensation voltage value for compensating torque ripples to thereby output a compensated voltage command value for the q-axis. The first compensation voltage value contains m-th harmonic components in the AC motor and varies depending on the rotational angle of the rotor, the m corresponding to the number of phase of the multiphase windings. The controller uses, as the voltage command value for the q-axis, the compensated voltage command value for the q-axis.

5 Claims, 6 Drawing Sheets

MOTOR DRIVE SYSTEM USING POTENTIAL AT NEUTRAL POINT

CROSS REFERENCE TO RELATED APPLICATIONS

This application is based on Japanese Patent Application 2009-147970 filed on Jun. 22, 2009. The descriptions of the patent application are all incorporated herein by reference.

FIELD OF THE INVENTION

The present invention relates to motor drive systems with star-connected multiphase stator windings, and, more particularly, to such motor drive systems that control a motor using the potential at a neutral point of the star-connected multiphase stator windings.

BACKGROUND OF THE INVENTION

Motor drive systems with secondary batteries are used in electric vehicles, hybrid vehicles, railways, or other machines. Such motor drive systems include an inverter that converts direct current into alternating current, and apply the alternating current to an AC (Alternating Current) motor, such as a brushless motor, to thereby drive the motor. These motor drive systems normally use a converter for boosting a battery voltage, and apply the boosted voltage to the inverter, thus achieving higher output power with low loss.

In contrast, there is proposed another type of motor drive systems designed to omit converters so as to reduce its size, weight, and cost. A motor drive system of this type is configured such that one end of each of star-connected three-phase windings of an AC motor is connected with a corresponding AC output of a three-phase bridge inverter and the other ends of the three-phase windings are collectively connected with each other at a neutral point in star-configuration. The motor drive system of this type includes a voltage-variable capacitor connected between the neutral point and a positive or negative DC input terminal of the inverter, and a DC power supply connected across the voltage-variable capacitor. An input capacitor is connected between the positive and negative DC input terminals of the inverter.

The motor drive system of this type is operated as a chopper in zero-voltage mode to control the potential at the neutral point.

Specifically, the motor drive system in the zero-voltage mode turns off, for example, all of the low-side switching elements of the inverter with all of the high-side switching elements being in on state. This allows a substantially direct current to flow, via the neutral point, through each of the three-phase windings and a corresponding one of the high-side switching elements based on the battery voltage. This charges electromagnetic energy in each of the three-phase windings.

Next, the motor drive system in the zero-voltage mode turns on all of the low-side switching elements of the inverter and turns off all of the high-side switching elements. This allows the sum of a voltage generated by the electromagnetic energy charged in each of the high-side switching elements and the battery voltage to be applied to the inverter. An example of the motor drive system of this type, which is operated as a chopper, is disclosed in Japanese Patent Application Publication No. H11-178114.

In the motor drive system of this type, the 3n-th harmonic induced voltages (n is an integer equal to or higher than 1) appear at the neutral point. In order to reduce a zero-phase current component based on the 3n-th harmonic induced voltages through the neutral point, Japanese Patent Application Publication No. 2001-204196 discloses a technique that adds, to three-phase command voltages for the three-phase stator windings, voltage components equivalent to the 3n-th harmonic induced voltages for cancelling the 3n-th harmonic induced voltages. This Patent Publication No. 2001-204196 achieves such an object to reduce the zero-phase current component based on the 3n-th harmonic induced voltages through the neutral point.

SUMMARY OF THE INVENTION

The inventors have discovered that there is a problem in the conventional motor drive systems using the potential at the neutral point.

In normal three-phase permanent magnet motors, the waveform of a voltage induced in each of three-phase stator windings is distorted due to the change in the rotational speed of a rotor. However, because the distorted waveforms of the induced voltages in the respective three-phase stator windings are symmetrical to each other, superpose of the three-phase induced voltages at the neutral point allows the distortions to cancel out against each other.

An additional reason for the appearance of distortion is that the potential at the neutral point relative to the ground changes with change in the induced voltage in each of the three-phase stator windings. The variation potential at the neutral point acts as a zero-phase induced voltage.

FIG. 5 schematically illustrates an example of the waveform of a U-phase induced voltage and an example of the waveform of a zero-phase induced voltage obtained by the sum of three-phase induced voltages. In normal motor drive systems without the neutral point being wired, the variation potential at the neutral point does not affect on line-to-line voltages in the three-phase stator windings because no zero-phase current flows through the neutral point.

However, in the motor drive system with the neutral point being wired, a zero-phase current flows through the wiring of the neutral point based on the variation potential at the neutral point.

That is, because the potential at the neutral point relative to the ground varies over time, the zero-phase current varies to generate ripples therein; these current ripples result in that ripples appear in an output torque of the motor.

Regarding this point, as described above, the Patent Publication No. 2001-204196 focuses the potential at the neutral point. However, the Patent Publication No. 2001-204196 fails to disclose or suggest such ripples appearing in the output torque of a motor due to the zero-phase current variations.

In view of the circumstances set force above, the present invention seeks to provide a motor drive system designed to solve the problem set forth above.

Specifically, the present invention aims at providing a motor drive system capable of reducing ripples appearing in the output torque of a motor due to zero-phase current variations.

According to one aspect of the present invention, there is provided a motor drive system for a multiphase AC motor that rotates a rotor with respect to a stator, the AC motor including multiphase windings whose one ends are connected, at a neutral point, to each other in star configuration. The rotor of the multiphase AC motor has a d-axis and a q-axis electromagnetically orthogonal to each other. The motor drive system includes a DC power source connected with the neutral point of the multiphase windings and designed to output a voltage, and a multiphase inverter having first and second DC input terminals and multiphase alternating-current output terminals. One of the first and second DC input terminals is connected with the DC power source. The multiphase alternating-current output terminals are respectively connected with the other ends of the multiphase windings. The motor drive system includes a power charge unit connected between the first and second DC input terminals of the multiphase inverter in parallel thereto. According to a current flowing through each of the multiphase windings, a rotational angle of the rotor, the outputted voltage from the DC power source, and a voltage charged in the power charge unit, a controller of the motor drive system carries out: generation of a voltage command value for each of the d-axis and q-axis; conversion of the voltage command value for each of the d-axis and q-axis into a voltage command value for each of the multiphase windings; and control of the multiphase inverter based on the voltage command value for each of the multiphase windings to thereby cause the multiphase inverter to generate a multiphase AC voltage to be applied to the multiphase windings. The controller is configured to: add, to the voltage command value for the q-axis, a first compensation voltage value for compensating torque ripples to thereby output a compensated voltage command value for the q-axis. The first compensation voltage value contains m-th harmonic components in the AC motor and varies depending on the rotational angle of the rotor, the m corresponding to the number of phase of the multiphase windings. The controller is configured to use, as the voltage command value for the q-axis, the compensated voltage command value for the q-axis.

BRIEF DESCRIPTION OF THE DRAWINGS

Other objects and aspects of the invention will become apparent from the following description of embodiments with reference to the accompanying drawings in which.

DETAILED DESCRIPTION OF EMBODIMENTS OF THE INVENTION

An embodiment of the present invention will be described hereinafter with reference to the accompanying drawings.

Figure 1:
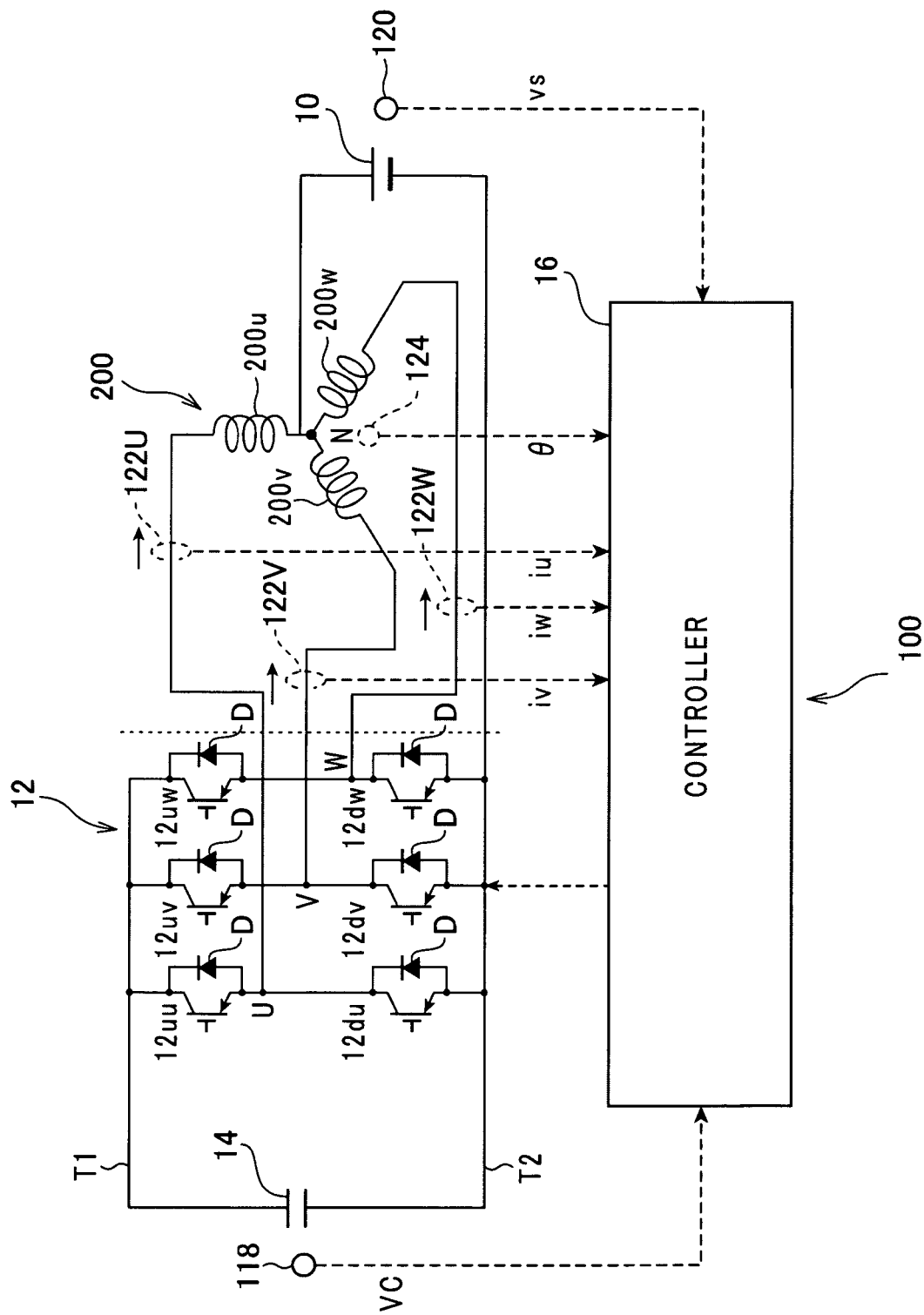
FIG. 1 is a circuit diagram schematically illustrating an example of the structure of a motor drive system for a three-phase AC motor according to an embodiment of the present invention.

Referring to FIG. 1, there is provided a motor drive system 100 for a three-phase AC motor 200 according to this embodiment of the present invention.

The three-phase AC motor 200 is comprised of a rotor (not shown), a stator core, and star connected three-phase stator windings 200U, 200V, and 200W wound in the stator core.

For example, the rotor is provided at its circumferential portions with at lest one pair of permanent magnets. The permanent magnets of the at least one pair are so embedded in the outer periphery of the rotor core as to be symmetrically arranged with respect to the center axis of the rotor at regular intervals in a circumferential direction of the rotor core.

One permanent magnet of the at least one pair has a north pole (N pole) directed radially outward away from the center of the rotor. The other permanent magnet has a south pole (S pole) directed radially outward away from the center of the rotor.

The rotor has a direct axis (d-axis) in line with a direction of magnetic flux created by, for example, the N pole, in other words, in line with a rotor N pole center line. The rotor also has a quadrature axis (q-axis) with a phase being $\pi/2$ radian electric angle leading with respect to a corresponding d-axis during rotation of the rotor. In other words, the q-axis is electromagnetically orthogonal to the d-axis.

The d and q axes constitute a d-q coordinate system (two-phase rotating coordinate system) defined in the rotor of the AC motor 200.

An inductance $L_d$ in the d-axis is lower than an inductance $L_d$ in the q-axis because the permanent magnets have a magnetic permeability constant lower than that of the iron so that the AC motor 200 has a salient-pole structure. Motors having a salient-pole structure means motors each having this inductance characteristic of the rotor.

Specifically, in an SPM (Surface Permanent Magnet) rotor or an IMP (Interior Permanent Magnet) rotor, d-axis is defined as the direction toward the center of the same polarity (N) pole thereof, and q-axis is defined as an axis electromagnetically orthogonal to the d-axis.

In a magnet-less motor, q-axis is defined as a minimal magnetic reluctance thereof, and d-axis is defined as an axis electromagnetically orthogonal to the q-axis.

Each of the three-phase stator windings 200U, 200V, and 200W has a first end and a second end opposite thereto. The first ends of the three-phase stator windings 200U, 200V, and 200W are commonly connected with each other; these commonly connected ends constitute a neutral point N. The three-phase windings are wound in the stator core such that they have a relative phase difference of $2\pi/3$ [rad] (120 degrees).

The AC motor 200 is configured such that, when thee-phase sinusoidal driving currents are supplied to flow through the respective three-phase stator windings 200U, 200V, and 200W, the three-phase stator windings 200U, 200V, and 200W generate a rotating magnetic field. The generated rotating magnetic field of the stator windings 200U, 200V, and 200W and a magnetic field generated by the field member rotate (move) the field member relative to the stator core.

The motor drive system 100 includes a direct current (DC) power source 10, a three-phase inverter 12, an input capacitor 14, a controller 16, first and second voltage sensors 118 and 120, current sensors 122U, 122V, and 122W, and an angular sensor 124. The motor drive system 100 is connected with the AC motor 200 and operative to supply the thee-phase sinusoidal driving currents to the AC motor 200 to thereby drive the AC motor 200.

The three-phase inverter, referred to simply as "inverter", 12 is comprised of a first pair of series-connected switching elements (upper and lower arms) 12uu and 12du, a second pair of series-connected switching elements (upper and lower arms) 12uv and 12dv, and a third pair (bridge arm) of series-connected switching elements (upper and lower arms) 12uw and 12dw. The inverter 12 is also comprised of flywheel diodes D connected in antiparallel with the switching elements 12uu, 12du, 12uv, 12dv, 12uw, and 12dw, respectively.

As the switching elements, IGBTs (Insulated Gate Bipolar Transistors) or power MOSFETs can be used. When the power MOSFETs are used as the switching elements, the intrinsic diodes of the power MOSFETs can be used instead of the flywheel diodes.

The cathode of each of the flywheel diodes D is connected with the drain of a corresponding one of the switching elements 12uu, 12du, 12uv, 12dv, 12uw, and 12dw, and the anode thereof is connected with the source of a corresponding one of the switching elements 12uu, 12du, 12uv, 12dv, 12uw, and 12dw.

The first to third pairs of switching elements 12uu, 12du, 12uv, 12dv, 12uw, and 12dw are parallely connected with each other in bridge configuration.

The input capacitor 14 is an example of power charge units that are capable of charging a DC current. The input capacitor 14 has one electrode and the other electrode.

Ends of the upper arms 12uu, 12uv, and 12uw are collected as a common connection terminal (DC input terminal) T1, and the common connection terminal T1 is connected with the one electrode of the input capacitor 14. Ends of the lower arms 12du, 12dv, and 12dw are collected as a common connection terminal (DC input terminal) T2, and the common connection terminal T2 is connected with the other electrode of the input capacitor 14.

The first voltage sensor 118 is connected with the controller 16 and operative to output, to the controller 16, a signal indicative of the voltage Vc across the electrodes of the input capacitor 14.

The other ends of the upper arms 12uu, 12uv, and 12uw are connected with the other ends of the lower arms 12du, 12dv, and 12dw at connection points U, V, and W, respectively. The second end of the U-phase stator winding 200u is connected with the connection point U of the upper and lower arms 12uu and 12du. The second end of the V-phase stator winding 200v is connected with the connection point V of the upper and lower arms 12uv and 12dv. The second end of the W-phase stator winding 200w is connected with the connection point W of the upper and lower arms 12uw and 12dw.

The current sensors 122U, 122V, and 122W are connected with the controller 60 and operative to measure instantaneous values of the thee-phase sinusoidal driving currents to flow through the respective three-phase stator windings 200U, 200V, and 200W. The current sensors 122U, 122V, and 122W are operative to output, to the controller 16, the measured instantaneous values of the thee-phase sinusoidal driving currents.

The angular sensor 124 is arranged, for example, close to the rotor of the AC motor 200 and operative to measure an actual rotational angle (electric angle) θ of the d-axis of the rotor with respect to a stator coordinate system fixed in space which characterizes the three-phase windings of the stator.

The angular sensor 124 is also operative to measure an actual electric angular velocity (rotational velocity) $\omega_e$ of the d-axis of the rotor. The electric angular velocity $\omega_c$ will be referred to as "rotor electric angular velocity $\omega_c$" hereinafter. The angular sensor 124 is connected with the controller 16 and operative to send, to the controller 16, the measured actual rotation angle θ and the rotor electric angular velocity $\omega_c$ of the rotor.

An electrochemical cell, a fuel cell, or a motor-generator can be used as the DC power source 10. The DC power source 10 has a positive terminal connected with the neutral point N, and a negative terminal connected with the common connection terminal T2 of the lower arms 12du, 12dv, and 12dw.

The second voltage sensor 120 is connected with the controller 16 and operative to output, to the controller 16, a signal indicative of an output voltage Vs of the DC power source 10.

The controller 16 is designed to drive the AC motor 200.

Specifically, the controller 16 is operative to:

receive, as values of motor-drive parameters, the actual rotation angle (electric angle) θ of the rotor, instantaneous values $I_u$, $I_v$, and $I_w$ of the U-, V-, and W-phase currents to be applied to the U-, V-, and W-phase stator windings 200U, 200V, and 200W, the output voltage Vs of the DC power source 10, and the voltage Vc across the electrodes of the input capacitor 14;

generate, based on the received values of the motor-drive parameters, individual drive signals for driving the respective switching elements 12uu, 12uv, 12uw, 12du, 12dv, and 12dw; and apply each of the drive signals to a corresponding one of the switching elements 12uu, 12uv, 12uw, 12du, 12dv, and 12dw to thereby drive it.

In this embodiment, each of the drive signals is a pulse signal (PWM signal) with a controllable duty cycle (controllable pulse width, that is, controllable on duration).

Specifically, the controller 16 is operative to apply each of the PWM signals to a corresponding one of the switching elements 12uu, 12du, 12uv, 12dv, 12uw, and 12dw. This allows a corresponding one of the switching elements 12uu, 12du, 12uv, 12dv, 12uw, and 12dw to be driven on during the pulse width (on-duration) of a corresponding one of the drive signals.

Figure 2:
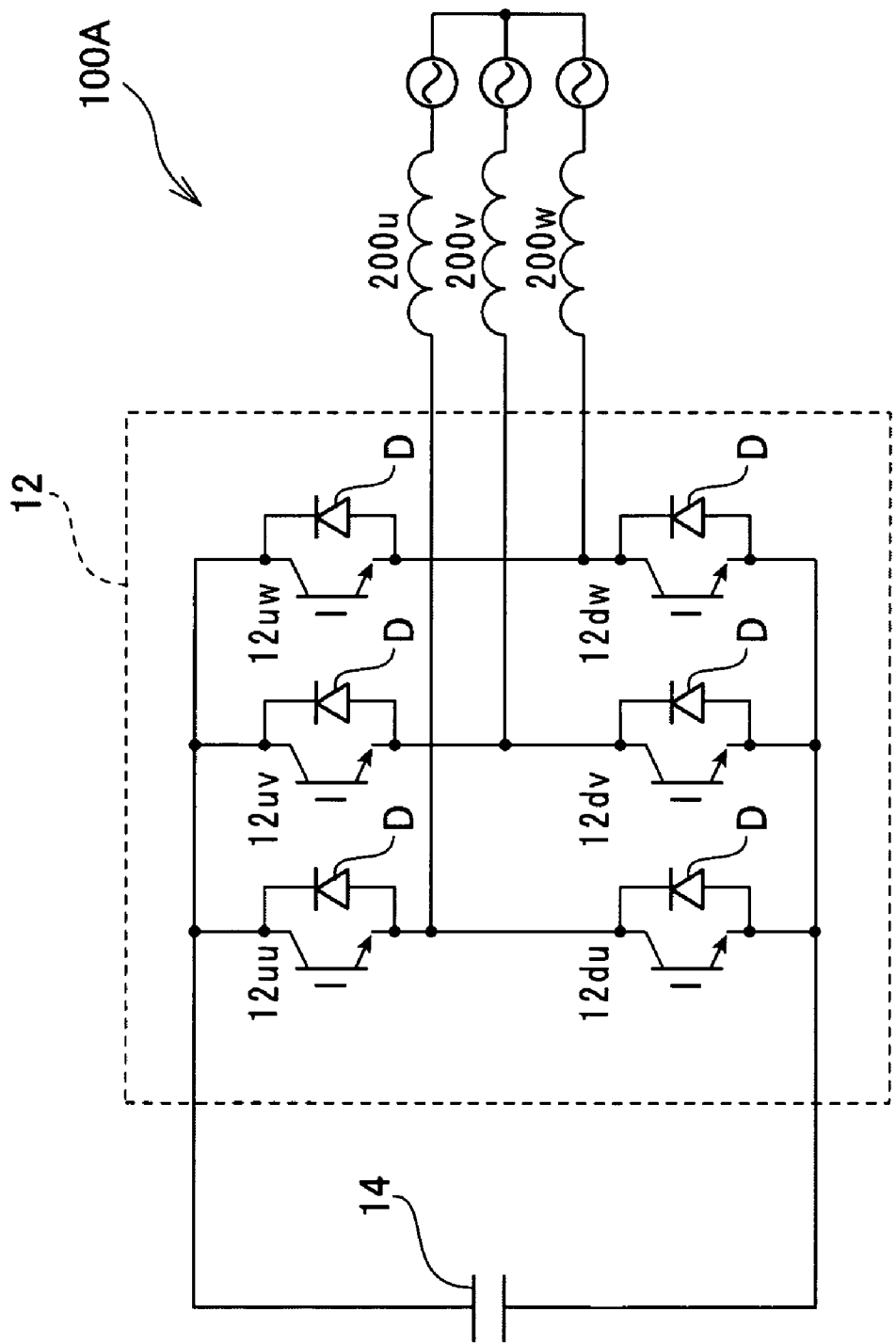
FIG. 2 is a circuit diagram schematically illustrating a positive-phase equivalent circuit of the motor drive system illustrated in FIG. 1.
Figure 3:
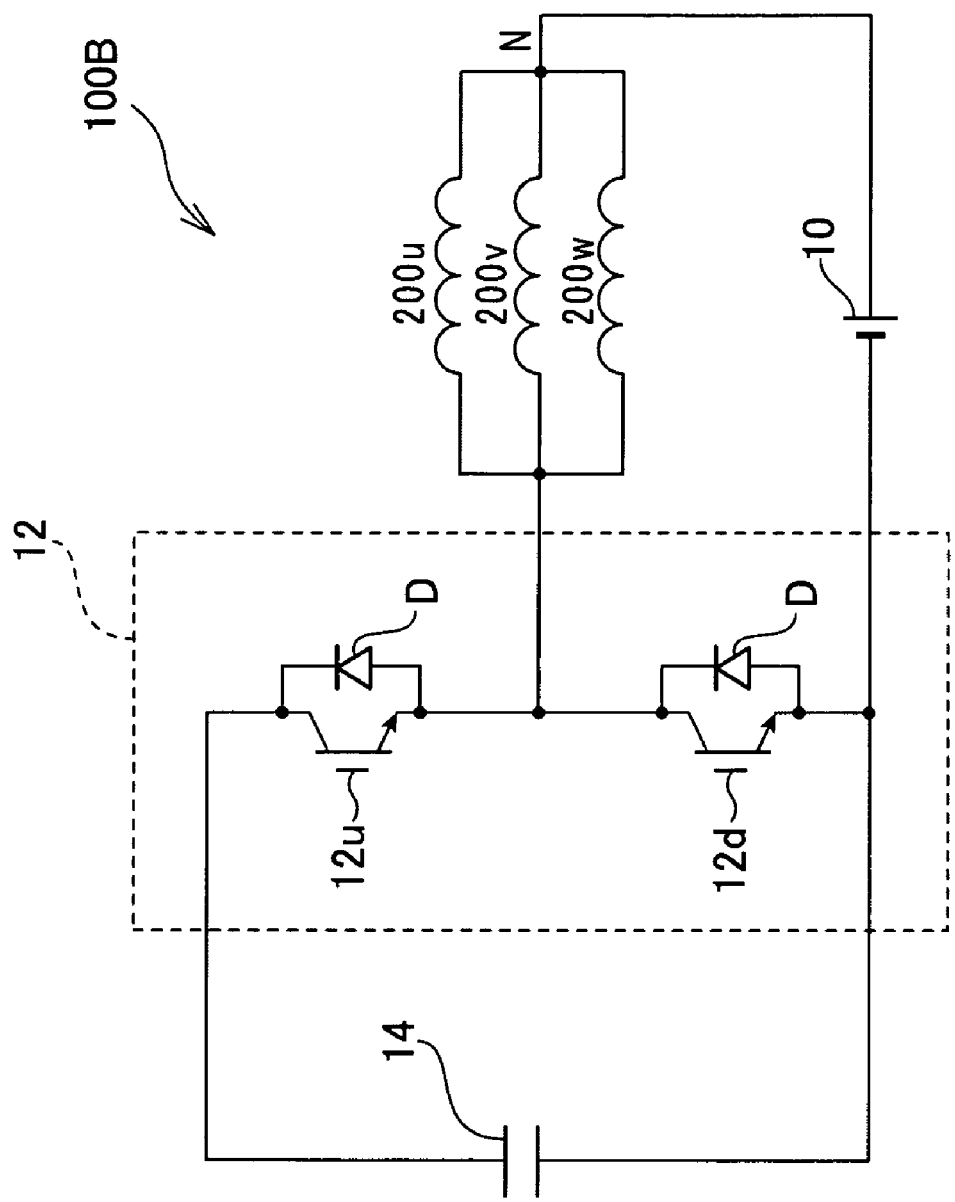
FIG. 3 is a circuit diagram schematically illustrating a zero-phase equivalent circuit of the motor drive system illustrated in FIG. 1.

The motor drive system 100 according to this embodiment functions as a combination of a positive-phase equivalent circuit 100A illustrated in FIG. 2 and a zero-phase equivalent circuit 100B illustrated in FIG. 3. Specifically, because the DC power source does not affect on torque to be generated by the AC motor 200, the motor drive system 100 is functionally separated into the positive-phase equivalent circuit 100A serving as a three-phase inverter and the zero-phase equivalent circuit 100B serving as a boost chopper.

For example, when the motor drive system 100 serves as the three-phase inverter 100A, the controller 16 individually drives each of the switching elements 12uu, 12du, 12uv, 12dv, 12uw, and 12dw based on a corresponding one PWM signal with a predetermined duty cycle. This allows the three-phase inverter 100A to chop the voltage Vc across the input capacitor 14 to thereby generate U-, and W-phase command voltages. The U-, V-, and W-phase command voltages are supplied to the respective U-, V-, and W-phase stator windings 200u, 200v, and 200w of the AC motor 200 to thereby drive the AC motor 200.

When the motor drive system 100 serves as the boost chopper 100B, the controller 16 drives and maintain all of the high-side switching elements 12uu, 12uv, 12uw (illustrated in 12u in FIG. 3) on or all of the low-side switching elements 12du, 12dv, 12dw (illustrated in 12d in FIG. 3) on. This allows a zero-phase current to flow from the DC power source 10 to the U-, V-, and W-phase stator windings 200u, 200v, and 200w via the neutral point N thereof.

For example, in the U-phase stator winding 200u, when the low-side switching element 12du is in on state while the high-side switching element 12uu is in off state, the output voltage Vs of the DC power source 10 causes the zero-phase current to flow through the U-phase stator winding 200u. This charges electromagnetic energy in the U-phase stator winding 200u.

When the low-side switching element 12du is turned off and the high-side switching element 12uu is turned on, the sum of a voltage generated by the electromagnetic energy charged in the U-phase stator winding 200u and the output voltage Vs of the DC power source 10 is applied to the DC input terminal of the inverter 12. Specifically, the potential of the positive DC input terminal of the inverter 12 is boosted by the sum of the voltage generated by the electromagnetic energy charged in the U-phase stator winding 200u and the output voltage Vs of the DC power source 10 so that the input capacitor 14 is charged by the potential of the positive DC input terminal of the inverter 12.

Note that, in this embodiment, in addition to the d-axis and q-axis, a zero-axis is defined as an axis electromagnetically orthogonal to the d-axis and q-axis. An electromotive force in the zero-axis is generated by the zero-phase equivalent circuit 100B.

Thus, in the motor drive system 100 using a potential at the neutral point N, a new voltage equation of the AC motor 200 in a "d-q-zero" coordinate system constituted by the d-, q-, and zero-axes is defined by adding, to a normal voltage equation of the AC motor 200 in the d-q coordinate system, the zero-axis electromotive force. The voltage equation of the AC motor 200 in the d-q-zero coordinate system will be given by the following equation [1]:

$$\begin{bmatrix} v_d \\ v_q \\ v_0 \end{bmatrix} = \begin{bmatrix} R+PL_d & -\omega_e L_q & 0 \\ \omega_e L_d & R+PL_q & 0 \\ 0 & 0 & R+PL_0 \end{bmatrix} \begin{bmatrix} i_d \\ i_q \\ i_0 \end{bmatrix} + \begin{bmatrix} 0 \\ \omega_e \Phi \\ -\omega_e \Phi K_{e0} \sin 3\theta \end{bmatrix} \quad [1]$$

where $v_d$ represents a d-axis voltage, represents a q-axis voltage, $v_0$ represents a zero-axis voltage, $i_d$ represents a d-axis current, $i_q$ represents a q-axis current, $L_q$ represents a zero-axis current, $L_d$ represents a d-axis inductance, $L_q$ represents a q-axis inductance, $L_0$ represents a zero-axis inductance, R represents a resistance of each winding, $\omega_e$ represents the electric angular velocity of the d-axis of the rotor, $\theta$ represents the rotational angle (electric angle) $\theta$ of the d-axis of the rotor with respect to the stator, $\phi$ represents the amount of flux of the permanent magnets, $K_{e0}$ represents the ratio of a q-axis electromotive force to the zero-axis electromotive force, P represents a differential operator equal to "d/dt", and p represents the number of pole pair of the rotor.

Note that $-\omega_e \phi K_{e0} \sin 3\theta$ represents the zero-axis electromotive force. Because it is well known that the potential at the neutral point of the star-connected three-phase stator windings changes with three times (3θ) of the cycle θ of three-phase sinusoidal voltages to be applied to the star-connected three-phase stator windings, the zero-axis electromotive force may cause the third ripples in the zero-phase current flowing through the neutral point N.

Figure 4:
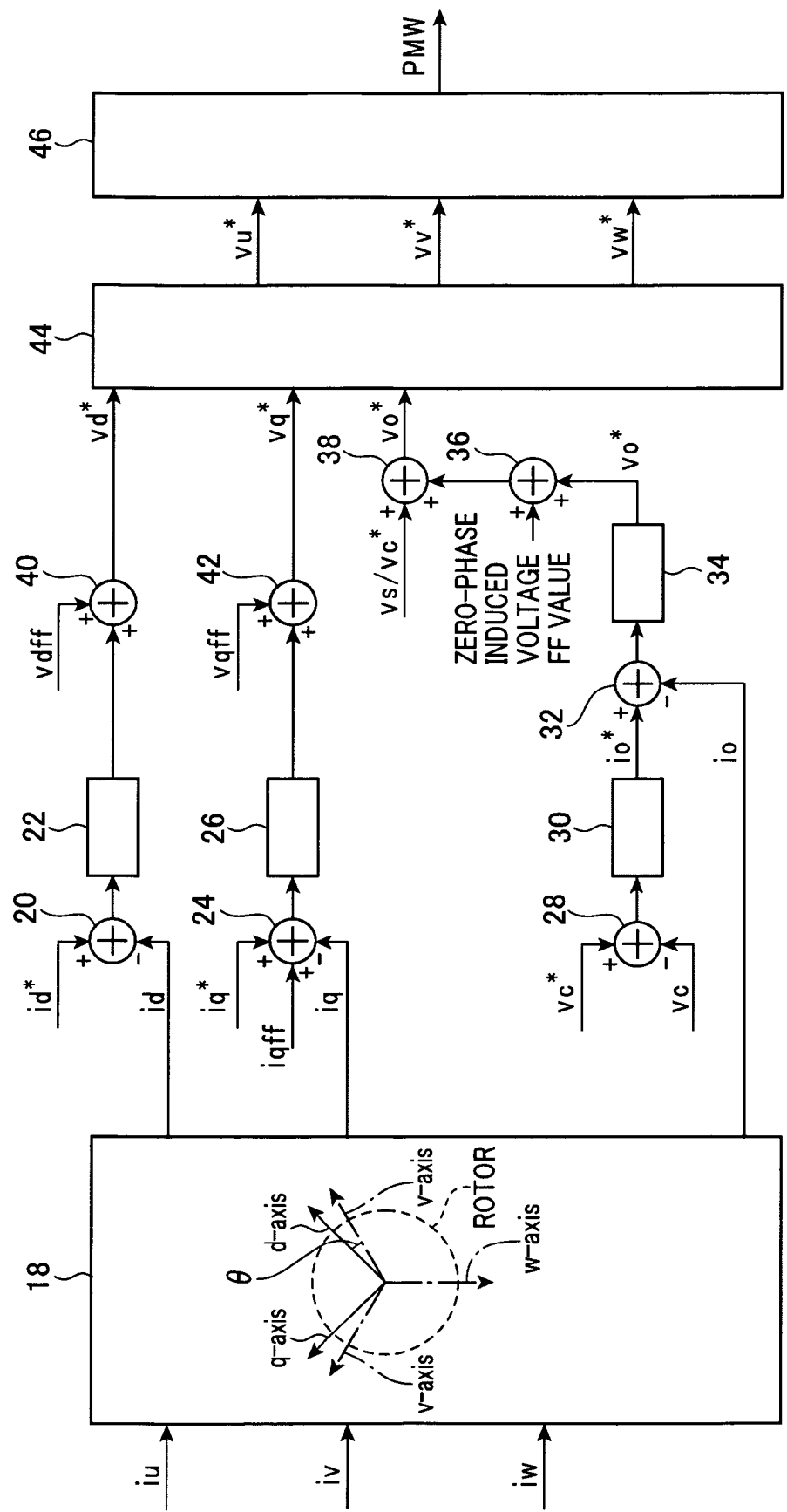
FIG. 4 is a bock diagram schematically illustrating functional modules of the controller illustrated in FIG. 1.
Figure 5:
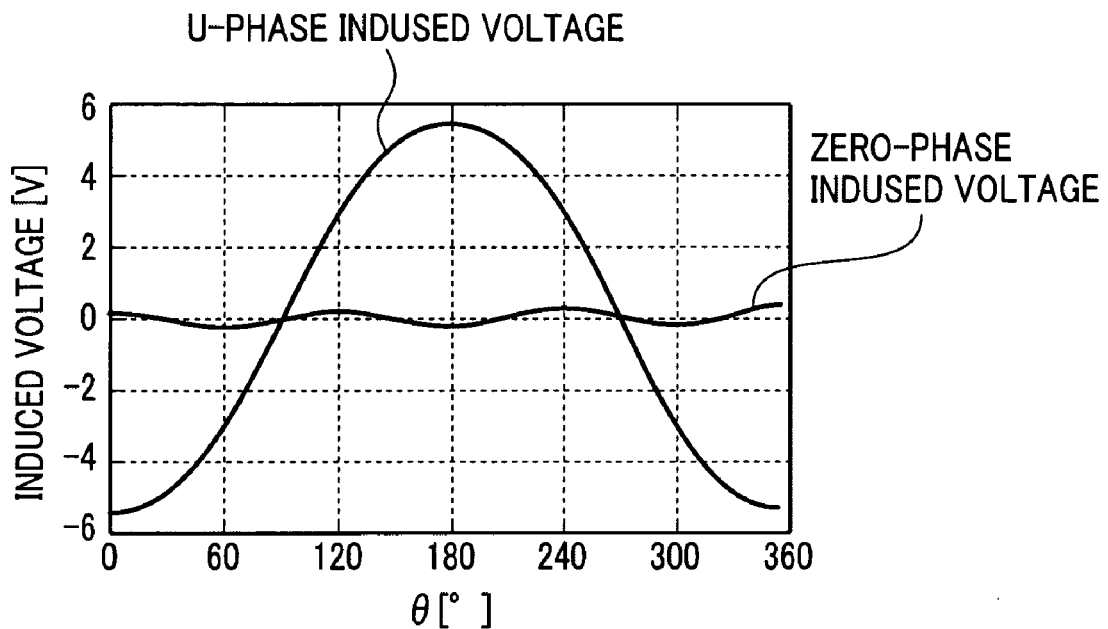
FIG. 5 is a graph schematically illustrating an example of the waveform of a U-phase induced voltage and an example of the waveform of a zero-phase induced voltage obtained by the sum of three-phase induced voltages.

FIG. 4 schematically illustrates functional modules of the controller 16 equivalent to PWM-signal generating tasks to the inverter 12 to be executed by the controller 16. Specifically, the controller 16 is designed to control the switching operations of the switching elements 12uu, 12du, 12uv, 12dv, 12uw, and 12dw in accordance with a proportional integral feedback algorithm based on the received values of the motor-drive parameters to thereby drive the AC motor 200.

Referring to FIG. 4, the controller 16 includes a UVW/dq0 converter 18, adders 20, 24, 28, 32, 36, 38, 40, and 42, PI calculators 22, 26, 30, and 34, a dq0/UVW converter 44, and a PWM modulator 46. Note that each of or some of the functional modules included in the controller 16 can be designed as a hardwired logic circuit, programmed logic circuit, or hardwired-logic and programmed-logic hybrid circuit.

To the UVW/dq0 converter 18, the instantaneous values $I_u$, $I_v$, and $I_w$ of the U-, V-, and W-phase currents and the electric rotational angle θ of the d-axis of the rotor are inputted. The UVW/dq0 converter 18 is operative to convert the received instantaneous values $I_u$, $I_v$, and $I_w$ of the U-, V-, and W-phase currents into the d-axis current value $i_d$, the q-axis current value $i_q$, and the zero-axis current value $i_0$ in accordance with the received electric rotational angle θ and the following equation [2]:

$$\begin{bmatrix} i_d \\ i_q \\ i_0 \end{bmatrix} = \begin{bmatrix} \cos\theta & -\sin\theta & 0 \\ \sin\theta & \cos\theta & 0 \\ 0 & 0 & 1 \end{bmatrix} \begin{bmatrix} 1 & -\frac{1}{\sqrt{2}} & -\frac{1}{2} \\ 0 & \frac{\sqrt{3}}{2} & -\frac{\sqrt{3}}{2} \\ \frac{1}{\sqrt{2}} & \frac{1}{\sqrt{2}} & \frac{1}{\sqrt{2}} \end{bmatrix} \begin{bmatrix} i_u \\ i_v \\ i_w \end{bmatrix} \quad [2]$$

Using the equation [2] allows instantaneous voltages of U-, V-, and W-phase voltages to be converted into d-, q-, and zero-axis voltage values.

The adder 28 is operative to subtract, from a command voltage Vc* for the input capacitor 14, the actually measured voltage Vc across the input capacitor 14 to thereby calculate a deviation Δ Vc between the command voltage Vc* and the actually measured voltage Vc. The adder 28 is operative to output the deviation Δ Vc to the PI calculator 30.

The PI calculator 30 is operative to set, based on the deviation Δ Vc, a zero-phase command current $i_0$* in the zero-axis; this zero-phase command current $i_0$* is required such that the command voltage Vc* is matched with the actually measured voltage Vc. For example, in this embodiment, the PI calculator 30 computes the zero-phase command current $i_0$* using a proportional gain term and an integral gain term of a proportional integral feedback algorithm.

In the proportional integral feedback algorithm, the zero-phase command current $i_0$* is expressed based on the proportional gain term and integral gain term.

The proportional gain term for the zero-phase command current $i_0$* contributes to change in the zero-phase command current $i_0$* in proportion to the deviation Δ Vc. The integral gain term is proportional to an accumulated offset of instantaneous values of the deviation Δ Vc over time to reset the accumulated offset (steady-state deviation) over time to zero.

The adder 32 is operative to subtract, from the zero-phase command current $i_0$*, an instantaneous value $i_0$ of the zero-phase current to thereby calculate a deviation $\Delta i_0$ between the instantaneous value $i_0$ of the zero-phase current and the zero-phase command current $i_q$*. The adder 32 is operative to output the deviation $\Delta i_0$ to the PI calculator 34. Note that the instantaneous value $i_0$ of the zero-phase current can be calculated in accordance with the following relationship between the instantaneous value $i_0$ of the zero-phase current and each of the instantaneous values $I_u$, $I_v$, and $I_w$ of the U-, V-, and W-phase currents:

$$i_0 = -(I_u + I_v + I_w)$$

The PI calculator 34 is operative to set, based on the deviation $\Delta i_0$, a command voltage $V_0^*$ for the input capacitor 14; this command voltage $V_0^*$ is required such that the zero-phase command current $i_0^*$ is matched with the instantaneous value $i_0$ of the zero-phase current. For example, in this embodiment, the PI calculator 34 computes the command voltage $V_0^*$ using a proportional gain term and an integral gain term of a proportional integral feedback algorithm as well as the PI calculator 30.

The voltage equation [1] represents that the third ripples in the zero-phase current flowing through the neutral point N depends on the zero-phase electromotive force $-\omega_c \Phi K_{c0} \sin 3\theta$. Thus, the controller 16 is designed to carry out feedforward control to previously add, to the zero-phase command voltage $V_0^*$, a third voltage component that cancels out the zero-phase electromotive force $-\omega_c \Phi K_{c0} \sin 3\theta$.

Specifically, the adder 36 is operative to add, to the command voltage $V_0^*$, a zero-phase induced voltage feedforward (FF) value $\omega_c \Phi K_{c0} \sin 3\theta$ that cancels out the zero-phase electromotive force $-\omega_c \Phi L_{c0} \sin 3\theta$. The adder 36 is operative to output, to the adder 38, a result of the addition.

The adder 38 is operative to add, to the output of the adder 36, the ratio "Vs/Vc*" of the output voltage Vs of the DC power source 10 to the command voltage Vc* to thereby calculate a zero-phase command voltage $V_0^*$. The adder 38 is operative to output, to the dq0/UVW converter 44, the zero-phase command voltage $V_0^*$.

On the other hand, the zero-phase electromotive force $-\omega_c \Phi K_{c0} \sin 3\theta$ causes a zero-phase torque $T_0$. Because the AC motor 200 has the salient pole structure, the zero-phase torque $T_0$ is given by the following equation [3]:

$$T_0 = -p\Phi K_{c0} \sin 3\theta \quad [3]$$

When the AC motor 200 does not have the salient pole structure, the zero-phase torque $T_0$ is given by the following equation [4]:

$$T_0 = p\Phi i_q \quad [4]$$

The equation [3] represents that the zero-phase torque $T_0$ appears as the third torque ripples with respect to a main torque Tb when the zero-phase current $i_0$ flows through the neutral point N.

Thus, the controller 16 is designed to carry out feedforward control to previously provide the main torque Tb with an oscillation that cancels out the third torque ripples. In order to give, to the main torque Tb, the oscillation that cancels out the third torque ripples, a q-axis feedforward current value $i_{qff}$ of $K_{c0} \sin 3\theta i_0$ is required.

Specifically, the adder 24 is operative to subtract, from a q-axis command current $i_q^*$, the instantaneous value $i_q$ of the q-axis current, and to add, to a result of the subtraction, the q-axis feedforward current value $i_{qff}$ of $K_{c0} \sin 3\theta i_0$.

The PI calculator 26 is operative to set, based on the output of the adder 24, a command voltage $V_q^*$; this command voltage $V_q^*$ is required such that the sum of the q-phase command current $i_q^*$ and the q-axis feedforward current value $i_{qff}$ of $K_{c0} \sin 3\theta i_0$ is matched with the instantaneous value $i_q$ of the q-axis current. For example, in this embodiment, the PI calculator 26 computes the command voltage $V_q^*$ using a proportional gain term and an integral gain term of a proportional integral feedback algorithm as well as the PI calculator 30.

In addition, in order to give, to the main torque Tb, the oscillation that cancels out the third torque ripples, a q-axis feedforward voltage value $V_{qff}$ of "$(R \sin \theta + L_q \cos 3\theta)K_{c0} i_0$" is required.

Thus, the adder 42 is operative to add, to the command voltage $V_q^*$ outputted from the adder 28, the q-axis feedforward voltage value $V_{qff}$ of "$(R \sin \theta + L_q \cos 3\theta)K_{c0} i_0$". The adder 42 is operative to output, to the dq0/UVW converter 44, a result of the addition as a q-axis command voltage value $V_q^*$.

The adder 20 is operative to subtract, from a d-axis command current $i_d^*$, the instantaneous value $i_d$ of the d-axis current to thereby calculate a deviation $\Delta i_d$ between the d-axis command current $i_d^*$ and the instantaneous value $i_d$ of the d-axis current. The adder 20 is operative to output, to the PI calculator 22, the deviation $\Delta i_d$.

The PI calculator 22 is operative to set, based on the deviation $\Delta i_d$ outputted from the adder 20, a command voltage $V_d^*$; this command voltage $V_d^*$ is required such that the d-phase command current $i_d^*$ is matched with the instantaneous value $i_d$ of the d-axis current. For example, in this embodiment, the PI calculator 22 computes the command voltage $V_d^*$ using a proportional gain term and an integral gain term of a proportional integral feedback algorithm as well as the PI calculator 30.

In addition, in order to give, to the main torque Tb, the oscillation that cancels out the third torque ripples, a d-axis feedforward voltage value $V_{dff}$ of "$-\omega_c L_q K_{c0} \sin 3\theta i_0$" corresponding to the q-axis feedforward voltage value $V_{qff}$ is required.

Thus, the adder 40 is operative to add, to the command voltage $V_d^*$, the d-axis feedforward voltage value $V_{dff}$ of "$-\omega_c L_q K_{r0} \sin 3\theta i_0$". The adder 40 is operative to output, to the dq0/UVW converter 44, a result of the addition as a d-axis command voltage value $V_d^*$.

The dq0/UVW converter 44 is operative to receive the d-axis command voltage value $V_d^*$, the q-axis command voltage value $V_q^*$, and the zero-phase command voltage $V_0^*$ outputted from the respective adders 40, 42, and 38. The dq0/UVW converter 44 is also operative to convert the d-, q-, and zero-axis command voltage values $V_d^*$, $V_q^*$, and $V_0^*$ into U-, V-, and W-phase sinusoidal voltage command values $V_u^*$, $V_v^*$, and $V_w^*$, respectively in accordance with the following equation [5]:

$$\begin{bmatrix} V_u^* \\ V_v^* \\ V_w^* \end{bmatrix} = \sqrt{\frac{2}{3}} \begin{bmatrix} \cos\theta & \sin\theta & 0 \\ -\sin\theta & \cos\theta & 0 \\ 0 & 0 & 1 \end{bmatrix} \begin{bmatrix} 1 & 0 & \frac{1}{\sqrt{2}} \\ -\frac{1}{2} & \frac{\sqrt{3}}{2} & \frac{1}{\sqrt{2}} \\ \frac{1}{2} & -\frac{\sqrt{2}}{2} & \frac{1}{\sqrt{2}} \end{bmatrix} \begin{bmatrix} V_d^* \\ V_q^* \\ V_0^* \end{bmatrix} \quad [5]$$

Using the equation [3] allows d-, q-, and zero-phase command currents to be converted into U-, V-, and W-phase command current values.

The PWM modulator 46 is operative to receive the U-, V-, and W-phase sinusoidal voltage command values $V_u^*$, $V_v^*$, and $V_w^*$ outputted from the dq0/UVW converter 44, and generate, according to a triangular (or saw-tooth) carrier wave, PWM signals with modulated pulse widths for the respective switching elements 12uu, 12du, 12uv, 12dv, 12uw, and 12dw. These PWM signals for the respective switching elements 12uu, 12du, 12uv, 12dv, and 12dw allow U-, V-, and W-phase sinusoidal voltages $V_u$, $V_v$, and $V_w$ applied thereto to be matched with the respective U-, V-, and W-phase sinusoidal voltage command values $V_u^*$, $V_v^*$, and $V_w^*$.

The PWM modulator 46 is also operative to apply, to each of the switching elements 12*uu*, 12*du*, 12*uv*, 12*dv*, 12*uw*, and 12*dw*, a corresponding one of the PWM signals.

This allows a corresponding one of the switching elements 12*uu*, 12*du*, 12*uv*, 12*dv*, 12*uw*, and 12*dw* to be turned on during the pulse width (on-duration) of a corresponding one of the PWM signals. This results in that the U-, V-, and W-phase sinusoidal voltages $V_u$, $V_v$ and $V_w$ matched with the respective U-, V-, and W-phase sinusoidal voltage command values $V_u^*$, $V_v^*$, and $V_w^*$ are actually applied to the respective U-, V-, and W-phase stator windings 200*u*, 200*v*, and 200*w* so that the AC motor 200 is driven based on the U-, V-, and W-phase sinusoidal voltages $V_u$, $V_v$, and $V_w$.

Note that the controller 16 according to this embodiment directly uses the electric rotational angle θ of the d-axis of the rotor, but can correct the electric rotational angle θ of the d-axis of the rotor in the light of the delay of control of the motor drive system 100. Specifically, the controller 16 can correct the electric rotational angle θ by adding, to the electric rotational angle θ, a component that compensates the delay of control of the motor drive system 100. When many motor drive systems 100 according to this embodiment are tried to be generated, it is necessary to individually adjust the delay of control of each of the motor drive systems 100 because the delay of control of each of the motor drive systems 100 depends on a corresponding one of the motor drive systems 100.

Figure 6:
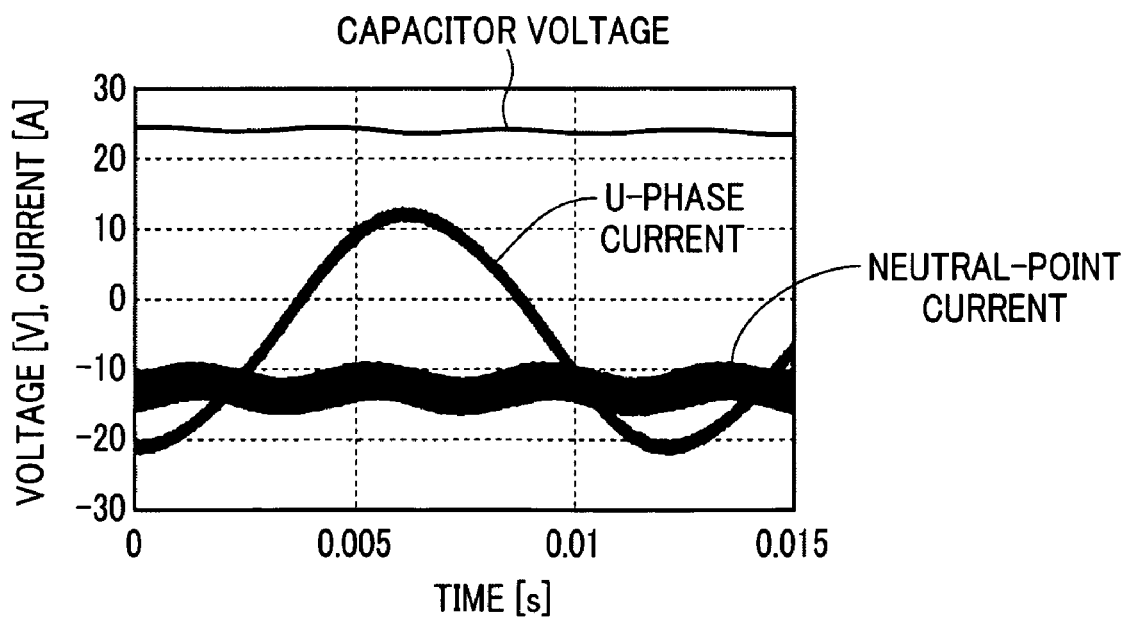
FIG. 6 is a graph schematically illustrates an example of the waveforms of a U-phase current, a neutral-point current, and a voltage across an input capacitor obtained by the motor drive system according to this embodiment without carrying out feedforward control for canceling out the third current ripples and torque ripples.

FIG. 6 schematically illustrates an example of the waveforms of a U-phase current $i_u$, a neutral-point current $i_n$, and a voltage Vc across the input capacitor 14 obtained by the motor drive system 100 without carrying out the feedforward control for canceling out the third current ripples and torque ripples. As illustrated in FIG. 6, the third current ripples are superposed on the neutral-point current in, and fluctuation components due to the third current ripples appear in the voltage Vc across the input capacitor 14.

Figure 7:
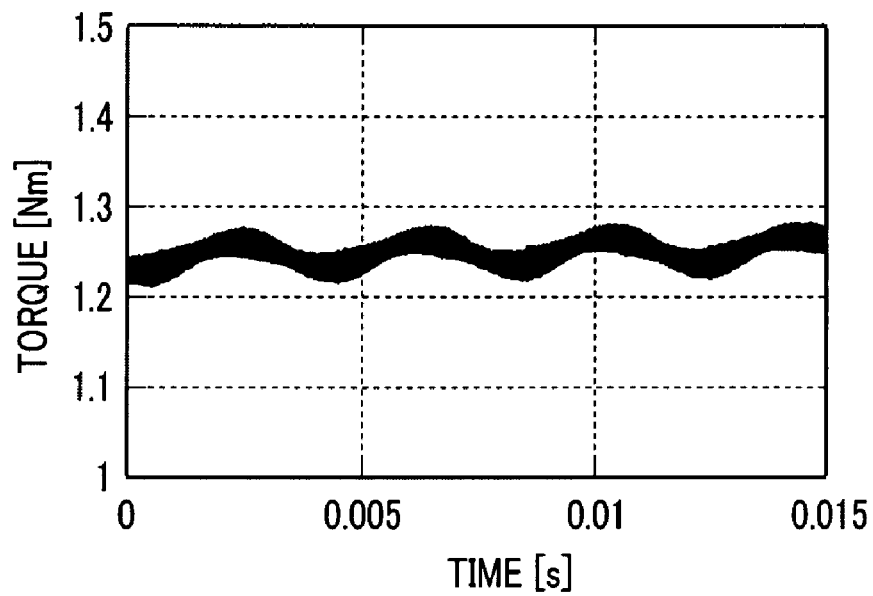
FIG. 7 is a graph schematically illustrating an example of the waveform of the output torque of the three-phase AC motor illustrated in FIG. 1 obtained by carrying out, by the motor drive system according to this embodiment, feedforward control for canceling out only the third current ripples according to this embodiment.

When the feedforward control for canceling out the third current ripples is only carried out by the motor drive system 100, the third current ripples on the neutral-point current in are reduced and the fluctuation components due to the third current ripples are substantially eliminated. However, as illustrated in FIG. 7, torque ripples remain to be superimposed on the output torque T of the AC motor 200; these torque ripples are due to the zero-phase current variations based on the variations in the potential at the neutral point N relative to the ground over time.

Figure 8:
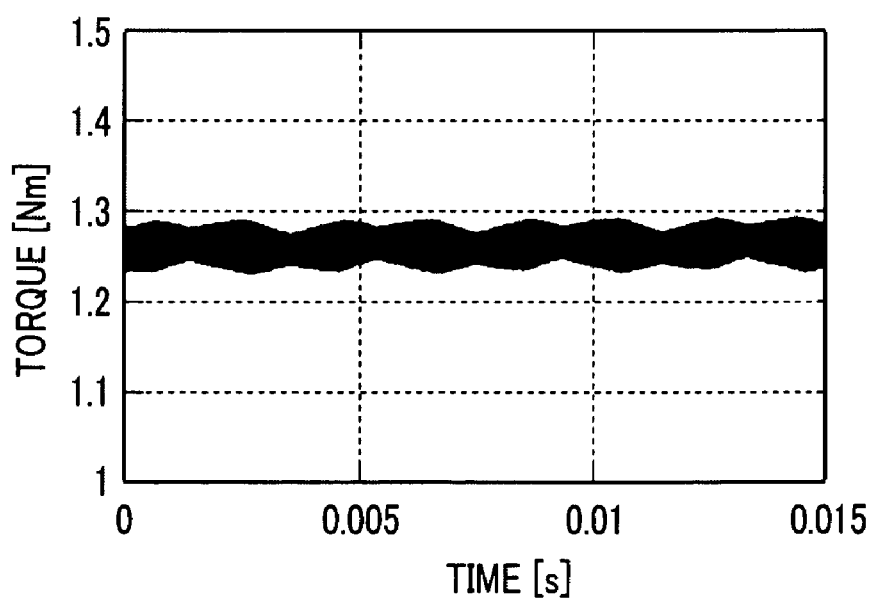
FIG. 8 is a graph schematically illustrating an example of the waveform of the output torque of the three-phase AC motor illustrated in FIG. 1 obtained by carrying out, by the motor drive system according to this embodiment, feedforward control for canceling out both the third current ripples and torque ripples according to this embodiment.

FIG. 8 schematically illustrates an example of the waveform of the output torque of the AC motor 200 according to this embodiment obtained by carrying out, by the motor drive system 100, the feedforward control for canceling out the third current ripples and torque ripples. As illustrated in FIG. 8, the torque ripples superimposed on the output torque T of the AC motor 200 are significantly reduced as compared with the waveform of the output torque T illustrated in FIG. 7. Note that, in FIG. 8, the waveform of the output torque of the AC motor 200 is illustrated by thick solid line because it contains ripples of the carrier wave.

As described above, the motor drive system 100 according to this embodiment reduces, in addition to the third current ripples on the neutral-point current in, torque ripples appearing in the output torque of the AC motor 200 due to the zero-phase current variations based on the variations in the potential at the neutral point N relative to the ground over time.

In this embodiment, as the AC motor 200, a PM is used, but another type of AC motors, such as a Synchronous Reluctance Motor having the q-axis with the minimal rotor magnetic reluctance and the d-axis defined to be electromagnetically orthogonal to the d-axis can be used.

In this embodiment, the star-connected three-phase AC motor 200 is used as a target motor to be controlled by the motor drive system 100, but star-connected multiphase AC motors can be used as a target motor to be controlled by the motor drive system 100.

While there has been described what is at present considered to be this embodiment and its modifications of the present invention, it will be understood that various modifications which are not described yet may be made therein, and it is intended to cover in the appended claims all such modifications as fall within the true spirit and scope of the invention.

What is claimed is:

1. A motor drive system for a multiphase AC motor that rotates a rotor with respect to a stator, the AC motor including multiphase windings whose one ends are connected, at a neutral point, to each other in star configuration, the rotor of the multiphase AC motor having a d-axis and a q-axis electromagnetically orthogonal to each other, the motor drive system comprising:

a DC power source connected with the neutral point of the multiphase windings and designed to output a voltage;

a multiphase inverter having first and second DC input terminals and multiphase alternating-current output terminals, one of the first and second DC input terminals being connected with the DC power source, the multiphase alternating-current output terminals being respectively connected with the other ends of the multiphase windings;

a power charge unit connected between the first and second DC input terminals of the multiphase inverter in parallel thereto; and a controller that, according to a current flowing through each of the multiphase windings, a rotational angle of the rotor, the outputted voltage from the DC power source, and a voltage charged in the power charge unit, carries out:

generation of a voltage command value for each of the d-axis and q-axis;

conversion of the voltage command value for each of the d-axis and q-axis into a voltage command value for each of the multiphase windings; and control of the multiphase inverter based on the voltage command value for each of the multiphase windings to thereby cause the multiphase inverter to generate a multiphase AC voltage to be applied to the multiphase windings, the controller being configured to:

add, to the voltage command value for the q-axis, a first compensation voltage value for compensating torque ripples to thereby output a compensated voltage command value for the q-axis, the first compensation voltage value containing m-th harmonic components in the AC motor and varying depending on the rotational angle of the rotor, the m corresponding to the number of phase of the multiphase windings; and use, as the voltage command value for the q-axis, the compensated voltage command value for the q-axis.

2. The motor drive system according to claim 1, wherein the controller is configured to:

carry out, as the generation of the voltage command value for the q-axis, generation of a current command value for the q-axis, and generation of the voltage command value for the q-axis based on the current command value for the q-axis;

add, to the current command value for the q-axis, a first compensation current value for compensating the torque ripples to thereby output a compensated current command value for the q-axis, the first compensation current value containing the m-th harmonic components in the AC motor and varying depending on the rotational angle of the rotor; and use, as the current command value for the q-axis, the compensated current command value for the q-axis.

3. The motor drive system according to claim 1, wherein the controller is configured to:

carry out, as the generation of the voltage command value for the d-axis, generation of a current command value for the d-axis, and generation of the voltage command value for the d-axis based on the current command value for the d-axis;

add, to the current command value for the d-axis, a second compensation current value for compensating the torque ripples to thereby output a compensated current command value for the d-axis, the second compensation current value containing the m-th harmonic components in the AC motor and varies depending on the rotational angle of the rotor; and use, as the current command value for the d-axis, the compensated current command value for the d-axis.

4. The motor drive system according to claim 1, wherein a zero-axis is defined as an axis electromagnetically orthogonal to the d-axis and the q-axis, the controller is configured to:

generate a voltage command value for the zero-axis;

carry out, as the conversion of the voltage command value for each of the d-axis and q-axis into the voltage command value for each of the multiphase windings, conversion of the voltage command value for each of the d-axis, the q-axis, and the zero-axis into a new voltage command value for each of the multiphase windings; and control of the multiphase inverter based on the new voltage command value for each of the multiphase windings to thereby cause the multiphase inverter to generate a new multiphase AC voltage to be applied to each of the multiphase windings, the controller being configured to:

add, to the voltage command value for the second compensation voltage value for compensating current ripples to thereby output a compensated voltage command value for the zero-axis, the second compensation voltage value containing the m-th harmonic components in the AC motor and varying depending on the rotational angle of the rotor; and use, as the voltage command value for the zero-axis, the compensated voltage command value for the zero-axis.

5. The motor drive system according to claim 4, wherein the controller is configured to:

carry out, as the generation of the voltage command value for the zero-axis, generation of a current command value for the zero-axis, and generation of the voltage command value for the zero-axis based on the current command value for the zero-axis;

add, to the current command value for the zero-axis, a third compensation current value for compensating the current ripples to thereby output a compensated current command value for the zero-axis, the third compensation current value containing the m-th harmonic components in the AC motor and varying depending on the rotational angle of the rotor; and use, as the current command value for the zero-axis, the compensated current command value for the zero-axis.

* * * * *